United States Patent
Li et al.

(10) Patent No.: US 11,262,493 B2
(45) Date of Patent: Mar. 1, 2022

(54) LIGHT GUIDE PLATE, BACKLIGHT MODULE AND DISPLAY DEVICE

(71) Applicants: BOE Technology Group Co., Ltd., Beijing (CN); Hefei Xinsheng Optoelectronics Technology Co., Ltd., Anhui (CN)

(72) Inventors: Hailong Li, Beijing (CN); Ning Wang, Beijing (CN); Xiaoliang Cheng, Beijing (CN); Xiaozhe Zhang, Beijing (CN); Yudong Liu, Beijing (CN)

(73) Assignees: BOE TECHNOLOGY GROUP CO., LTD., Beijing (CN); HEFEI XINSHENG OPTOELECTRONICS TECHNOLOGY CO., LTD, Anhui (CN)

( * ) Notice: Subject to any disclaimer, the term of this patent is extended or adjusted under 35 U.S.C. 154(b) by 0 days.

(21) Appl. No.: 15/755,809

(22) PCT Filed: Aug. 24, 2017

(86) PCT No.: PCT/CN2017/098758
§ 371 (c)(1),
(2) Date: Feb. 27, 2018

(87) PCT Pub. No.: WO2018/126705
PCT Pub. Date: Jul. 12, 2018

(65) Prior Publication Data
US 2020/0116916 A1    Apr. 16, 2020

(30) Foreign Application Priority Data
Jan. 3, 2017    (CN) .......................... 201710002393.3

(51) Int. Cl.
*F21V 8/00*    (2006.01)
*G02F 1/13357*    (2006.01)

(52) U.S. Cl.
CPC .......... *G02B 6/0031* (2013.01); *G02B 6/002* (2013.01); *G02B 6/0016* (2013.01);
(Continued)

(58) Field of Classification Search
CPC .. G02B 6/0031; G02B 6/0053; G02B 6/0041; G02B 6/0016; G02B 6/0018; G02B 6/002; G02B 6/0023
See application file for complete search history.

(56) References Cited

U.S. PATENT DOCUMENTS 7,360,937 B2 *    4/2008    Han ..................... G02B 6/0026
                                                             257/E33.073
7,645,048 B2 *    1/2010    Iwasaki ................ G02B 6/0073
                                                                  362/608
(Continued)

FOREIGN PATENT DOCUMENTS

CN          1683966 A       10/2005
CN        101055326 A       10/2007
(Continued)

OTHER PUBLICATIONS

International Search Report and Written Opinion for PCT Application PCT/CN2017/098758 dated Nov. 1, 2017.
(Continued)

*Primary Examiner* — Arman B Fallahkhair
(74) *Attorney, Agent, or Firm* — Fay Sharpe LLP

(57) ABSTRACT

A light guide plate, a backlight module and a display device in the field of display technology are provided. The light guide plate includes a light guide plate body and a prism structure located at at least one end of the light guide plate body. The prism structure includes a light incident surface and at least one reflective surface, and incident light from the light incident surface is can be reflected by the at least one reflective surface into the light guide plate body.

18 Claims, 6 Drawing Sheets

(52) U.S. Cl.
CPC ......... *G02B 6/0018* (2013.01); *G02B 6/0023* (2013.01); *G02F 1/1336* (2013.01)

(56) References Cited

U.S. PATENT DOCUMENTS

| | | | | |
|---|---|---|---|---|
| 8,894,266 | B2* | 11/2014 | Ye | G02B 6/002 |
| | | | | 362/609 |
| 8,899,816 | B2* | 12/2014 | Lin | F21S 8/00 |
| | | | | 362/610 |
| 9,535,204 | B2* | 1/2017 | Kunimochi | G02B 6/0046 |
| 9,690,036 | B1* | 6/2017 | Hou | G02B 6/005 |
| 9,823,403 | B2* | 11/2017 | Ohno | G02B 6/0036 |
| 9,851,488 | B2* | 12/2017 | Kim | G02B 6/0016 |
| 9,995,866 | B2* | 6/2018 | Chen | G02B 17/00 |
| 10,437,031 | B2* | 10/2019 | Danziger | G02B 6/34 |
| 2008/0260328 | A1* | 10/2008 | Epstein | G02B 6/0018 |
| | | | | 385/32 |
| 2011/0013418 | A1* | 1/2011 | Kanade | G02B 6/0028 |
| | | | | 362/606 |
| 2011/0286237 | A1* | 11/2011 | Tanoue | G02B 6/0016 |
| | | | | 362/606 |
| 2014/0185321 | A1* | 7/2014 | Chang | G02B 6/002 |
| | | | | 362/611 |
| 2016/0154167 | A1 | 6/2016 | Wang | |

FOREIGN PATENT DOCUMENTS

| | | |
|---|---|---|
| CN | 202102136 U | 1/2012 |
| CN | 202720356 U | 2/2013 |
| CN | 104503016 A | 4/2015 |
| CN | 104776363 A | 7/2015 |
| CN | 105259606 A | 1/2016 |
| CN | 106772771 A | 5/2017 |
| CN | 206321812 U | 7/2017 |
| JP | 2012123995 A | 6/2012 |
| WO | WO2016086534 A1 | 6/2016 |

OTHER PUBLICATIONS

First Office Action of the priority Chinese application No. 201710002393.3 dated Feb. 28, 2019.

* cited by examiner

LIGHT GUIDE PLATE, BACKLIGHT MODULE AND DISPLAY DEVICE

CROSS REFERENCE TO RELATED APPLICATION

This application is a 371 of PCT Patent Application PCT/CN2017/098758 filed Aug. 24, 2017, which, claims priority to Chinese Patent Application No. 201710002393.3, filed with the State Intellectual Property Office on Jan. 3, 2017, the entire contents of which are incorporated herein by reference.

TECHNICAL FIELD

The present disclosure relates to the field of display technology, more particularly, to a light guide plate, a backlight module and a display device.

BACKGROUND

A backlight module is a light source that is fixed to the back of a liquid crystal display (LCD), generally adopts a light bar (L/B), namely, a light-emitting diode (LED), as a light-emitting source, and comprises a light guide plate. Light emitted by the light bar is transmitted through the light guide plate. Therefore, the light transmission effect of the light guide plate directly affects the optical quality of the backlight module.

SUMMARY

Embodiments of the present disclosure provide a light guide plate, a backlight module and a display device, capable of improving the hot spot phenomenon in the backlight module and the light uniformity of the light guide plate, thereby improving the optical quality of the backlight module.

In a first aspect of the present disclosure, there is provided a light guide plate. The light guide plate includes: a light guide plate body and a prism structure located at at least one end of the light guide plate body. The prism structure comprises a light incident surface and at least one reflective surface, and incident light from the light incident surface is reflected by the at least one reflective surface into the light guide plate body.

In an embodiment, the light guide plate body comprises a first surface and a second surface opposite to the first surface, where the first surface is a light emitting surface of the light guide plate body. The at least one reflective surface comprises a first reflective surface and a second reflective surface. The first reflective surface is adjacent to the first surface, and the second reflective surface is adjacent to the second surface. The light incident surface is not parallel to the second surface or the first reflective surface, and incident light from the light incident surface is reflected by the first reflective surface onto the second reflective surface and then is reflected by the second reflective surface into the light guide plate body.

In an embodiment, the at least one reflective surface further comprises a third reflective surface adjacent to the light incident surface and the first reflective surface, respectively.

In an embodiment, the at least one reflective surface comprises a fourth reflective surface. The light incident surface is adjacent but not parallel to the first surface, and the fourth reflective surface is coplanar with the second surface. Incident light from the light incident surface is reflected by the fourth reflective surface into the light guide plate body.

In an embodiment, a light diffusion structure is arranged in the prism structure.

In an embodiment, the light diffusion structure comprises diffusion particles or bubbles.

In an embodiment, the light guide plate body and the prism structure form an integral structure.

In an embodiment, the at least one reflective surface is formed by a reflective layer arranged on the outer surface of the prism structure.

In an embodiment, diffusion particles are arranged between the reflective layer and the outer surface of the prism structure.

In an embodiment, the material of the diffusion particles includes polyethylene terephthalate.

In an embodiment, the diameters of the diffusion particles are about 10-30 micrometers.

In a second aspect of the present disclosure, there is provided a backlight module. The backlight module includes: a light bar and the light guide plate in of any embodiment of the present disclosure. A light emitting surface of the light bar is opposite to the light incident surface.

In a third aspect of the present disclosure, there is provided a display device. The display device includes the backlight module in any embodiment of the present disclosure.

BRIEF DESCRIPTION OF THE DRAWINGS

To describe the technical solutions in the embodiments of the present disclosure more clearly, the following briefly introduces the accompanying drawings required for describing the embodiments. Apparently, the accompanying drawings in the following description show merely some embodiments of the present disclosure, and a person of ordinary skill in the art may still derive other drawings from these accompanying drawings without creative efforts. In the drawings:

FIG. 2-1 is a structural schematic diagram of a light guide plate provided in an embodiment of the present disclosure;

FIG. 2-2 is a structural schematic diagram of another light guide plate provided in an embodiment of the present disclosure;

FIG. 2-3 is a structural schematic diagram of yet another light guide plate provided in an embodiment of the present disclosure;

FIG. 2-4 is a structural schematic diagram of a light guide plate provided in another embodiment of the present disclosure;

FIG. 2-5 is a structural schematic diagram of another light guide plate provided in another embodiment of the present disclosure;

FIG. 3-1 is a schematic diagram of a backlight module on which a Hot Spot phenomenon occurs in the prior art;

FIG. 3-2 is a schematic diagram of another backlight module on which a Hot Spot phenomenon occurs in the prior art;

FIG. 3-3 is a schematic diagram of yet another backlight module on which a Hot Spot phenomenon occurs in the prior art;

FIG. 4-1 is a structural schematic diagram of a backlight module provided in an embodiment of the present disclosure;

FIG. 4-2 is a structural schematic diagram of another backlight module provided in an embodiment of the present disclosure;

FIG. 4-3 is a structural schematic diagram of yet another backlight module provided in an embodiment of the present disclosure;

FIG. 5 is a structural schematic diagram of a backlight module with a light diffusion structure in the prism structure provided in an embodiment of the present disclosure.

Reference numbers indicate corresponding parts or features in the views of the drawings.

DETAILED DESCRIPTION OF THE EMBODIMENTS

The present disclosure will be described in further detail with reference to the enclosed drawings, to clearly present the objects, technique solutions, and advantages of the present disclosure.

The singular forms of the terms used herein and in the claims comprise the plural forms and vice versa, unless otherwise indicated explicitly in the context. Thus, when referring to a singular, it generally comprises the plural of the corresponding term. Similarly, the terms "comprise", "include" and their grammatical variations are to be explained as being inclusive rather than exclusive, unless explicitly prohibited herein. Where the term "example" is used herein, and particularly, when it is behind a group of terms, the "example" is merely exemplary and illustrative and should not be considered as exclusive or extensive.

Figure 1:
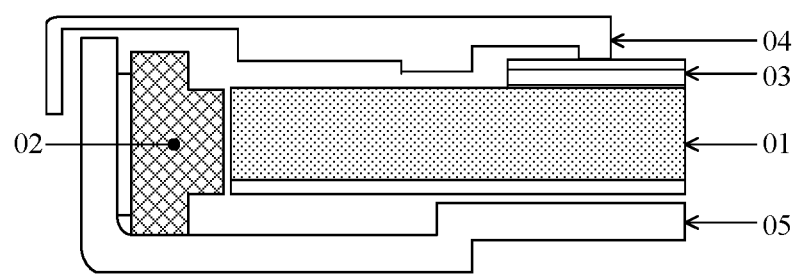
FIG. 1 is a structural schematic diagram of a backlight module.

FIG. 1 shows the structure of a backlight module. The backlight module may comprise a light guide plate 01, a light bar 02, an optical film 03, a plastic frame 04 and a back plate 05. The light guide plate 01 in the backlight module generally adopts a cuboid structure. The light bar 02 is directly opposite to one side surface of the light guide plate 01 (namely, the light incident side of the light guide plate), and the side surface is a smooth plane. The light emitted by the light bar 02 can be directly incident on the light guide plate 01 from the side surface and transmitted in the light guide plate. The optical film 03 is arranged at the light emitting side of the light guide plate 01. A partial structure of the plastic frame 04 at the side where the light bar 02 is located is arranged on the edge of the optical film 03.

However, in the structure shown in FIG. 1, as the light bar 02 is directly opposite to the side surface of the light guide plate 01 and the side of the plastic frame 04 where the light bar 02 is located adopts an external clamping structure poor in structural strength, when the plastic frame 04 is deformed by extrusion, a part of light emitted by the light bar may directly escape from the backlight module without passing through the light guide plate, resulting in a hot spot phenomenon in the backlight module (for example, there is a bright light beam zone at the side of the light guide plate that is close to the light bar, resulting in non-uniform brightness). Therefore, the uniformity of light emitted from the light guide plate is affected, and the optical quality of the backlight module is relatively poor.

In the embodiment of the present disclosure, a prism structure is arranged at the side surface of the light guide plate. Light emitted from a light source (for example, the light bar arranged on the light incident surface of the prism structure) is reflected by the reflective surface of the prism structure, so that light incident in the light guide plate body is more uniform, and the hot spot phenomenon of the backlight module can be improved, thereby improving the optical quality of the backlight module.

Figures 1, 2:
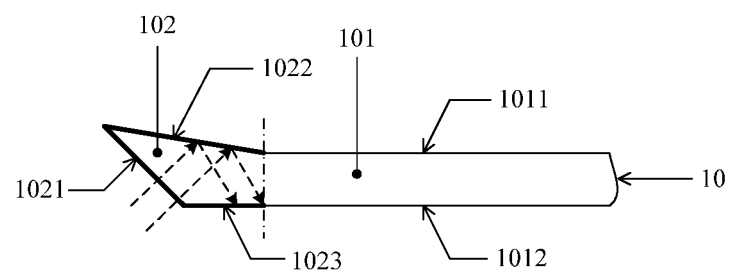
Figure 2:
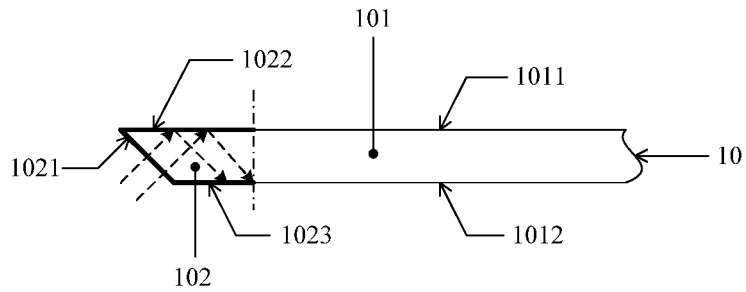

In accordance with an aspect of the present disclosure, there is provided a light guide plate 10. As shown in FIG. 2-1, the light guide plate 10 may comprise a light guide plate body 101 and a prism structure 102 located at at least one end of the light guide plate body 101. The prism structure 102 may comprise a light incident surface 1021 and at least one reflective surface. Incident light from the light incident surface 1021 can be reflected by the at least one reflective surface into the light guide plate body 101.

In the embodiment of the present disclosure, the light guide plate body 101 and the prism structure 102 located at at least one end of the light guide plate body 101 may form an integral structure. Alternatively, the prism structure 102 may also be a separate component independent from the light guide plate body 101 and attached to the light guide plate body 101.

In the embodiment of the present disclosure, the light guide plate body 101 may comprise a first surface 1011 and a second surface 1012 parallel to the first surface. In an embodiment, the first surface 1011 may serve as a light-emitting surface of the light guide plate body, and the second surface 1012 may comprise a mesh point structure for scattering light as a mesh point surface of the light guide plate body. The mesh point structure may facilitate more light to emit out from the light emitting surface.

In the embodiment of the present disclosure, the light guide plate body 101 may adopt a cuboid structure. However, the light guide plate body may adopt other geometric shapes. Those skilled in the art can select a suitable geometric shape in accordance with actual needs, which is not limited herein.

In this embodiment, the light guide plate 10 may be arranged in a side-in backlight module, and the prism structure 102 is arranged at the side surface of the light guide plate 10. Light enters the prism structure 102 from the light incident surface thereof, then enters the light guide plate body 101 from the side surface thereof after being reflected by the reflective surface of the prism structure 102, and may be emitted from the first surface 1011 after being reflected and/or scattered by the second surface 1012.

The light guide plate provided by the embodiment of the present disclosure comprises the light guide plate body and the prism structure located at at least one end of the light guide plate. The light incident surface of the light guide plate is arranged in the prism structure. The incident light from the light incident surface enters the light guide plate body after being reflected by the reflective surface of the prism structure. As the prism structure achieves the primary uniformity of the light by reflecting the light, the light incident in the light guide plate body can be more uniform. Therefore, the occurrence possibility of the hot spot phenomenon in the backlight module is reduced, and the optical quality of the backlight module is improved.

In an embodiment, as shown in FIG. 2-1, the at least one reflective surface may comprise a first reflective surface 1022 and a second reflective surface 1023. The first reflective surface 1022 is adjacent to the first surface 1011, and the second reflective surface 1023 is adjacent to the second surface 1012. The light incident surface 1021 is not parallel to the second surface 1012 or the first reflective surface 1022. Incident light from the light incident surface 1021 is reflected by the first reflective surface 1022 onto the second reflective surface 1023, and then is reflected by the second reflective surface 1023 into the light guide plate body 101.

In this embodiment, after passing through the prism structure, the incident light from the light incident surface is reflected by the first reflective surface onto the second reflective surface, and then is reflected by the second reflective surface into the light guide plate body, so that the primary uniformity of the light is realized, and the optical quality of the backlight module is improved.

In an embodiment, as shown in FIG. 2-1, the first reflective surface 1022 may not be parallel to the first surface 1011, and the second reflective surface 1023 may be parallel to the second surface 1012. In another embodiment, as shown in FIG. 2-2, the first reflective surface 1022 may be parallel to the first surface 1011, and the second reflective surface 1023 may be parallel to the second surface 1012. In yet another embodiment, the first reflective surface 1022 may not be parallel to the first surface 1011, and the second reflective surface 1023 may not be parallel to the second surface 1012.

Figures 2, 3:
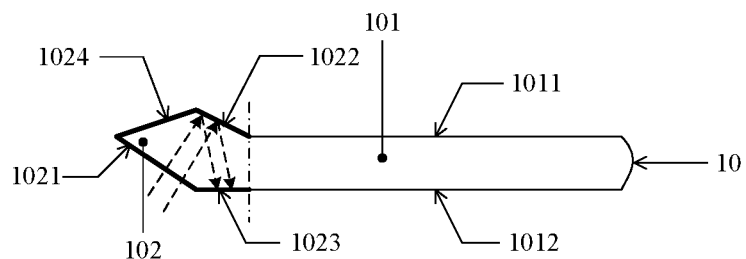

In an alternative embodiment, as shown in FIG. 2-3, the at least one reflective surface may further comprise a third reflective surface 1024 adjacent to the light incident surface 1021 and the first reflective surface 1022.

In the light guide plate shown in FIG. 2-1, a part of light incident on the prism structure may escape from the edges of both the light incident surface and the first reflective surface after being reflected by the reflective surface, resulting in light waste potentially. In the structure shown in FIG. 2-3, the third reflective surface 1024 may reflect a part of light reflected by the first reflective surface 1022 and the second reflective surface 1023 into the prism structure to limit the incident light in the prism structure as much as possible, so that the light utilization ratio increases.

It should be noted that the angle between the light incident surface and any of the reflective surfaces and the angles between the reflective surfaces in the prism structure provided by the embodiments of the present disclosure may be adjusted in accordance with actual needs, and the parameters of the reflective surfaces may be determined in accordance with actual needs, which are not limited by the embodiments of the present disclosure.

Figures 2, 3, 4:
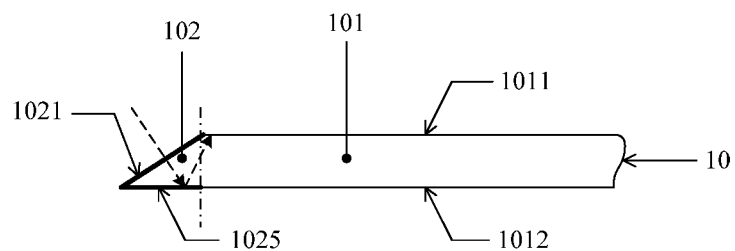

In an alternative embodiment, as shown in FIG. 2-4, the at least one reflective surface in the prism structure 102 may comprise a fourth reflective surface 1025. The light incident surface 1021 is adjacent but not parallel to the first surface 1011, and the fourth reflective surface 1025 is coplanar with the second surface 1012. Incident light from the light incident surface 1021 is reflected by the fourth reflective surface 1025 into the light guide plate body 101.

The light guide plate shown in FIG. 2-4 has a simple structure, can meet the requirement of uniformity on light in the prism structure, only needs one reflective surface, and thus is convenient to manufacture.

Figures 2, 3, 4, 5:
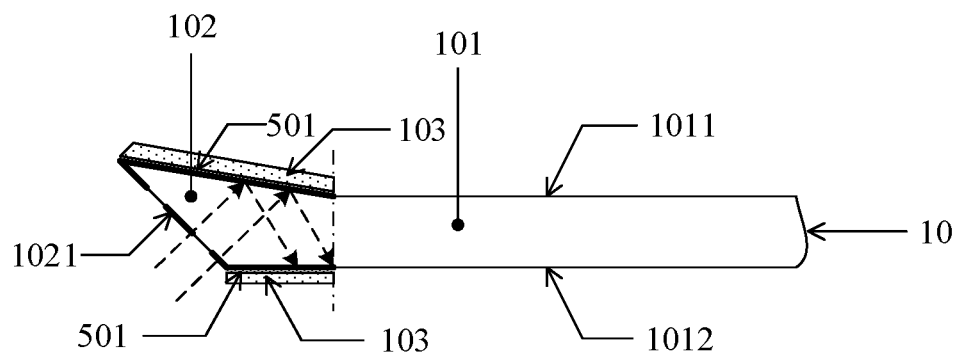
Figures 1, 3:
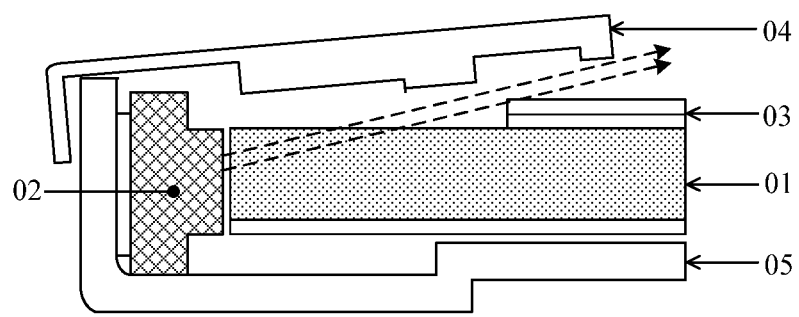
Figures 2, 3:
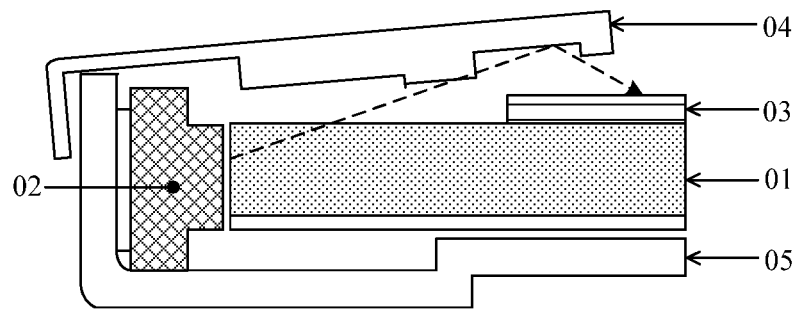
Figure 3:
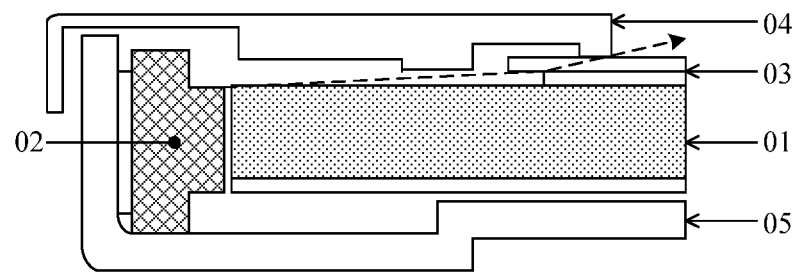
Figures 1, 4:
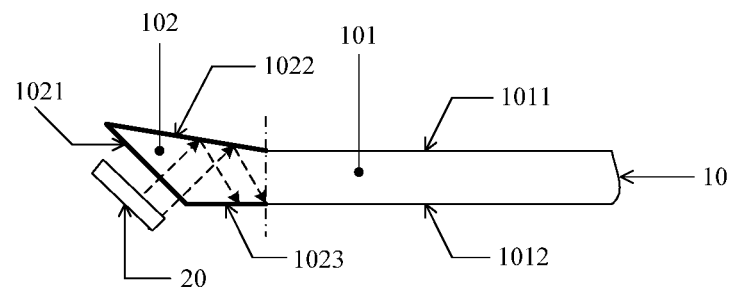
Figures 2, 4:
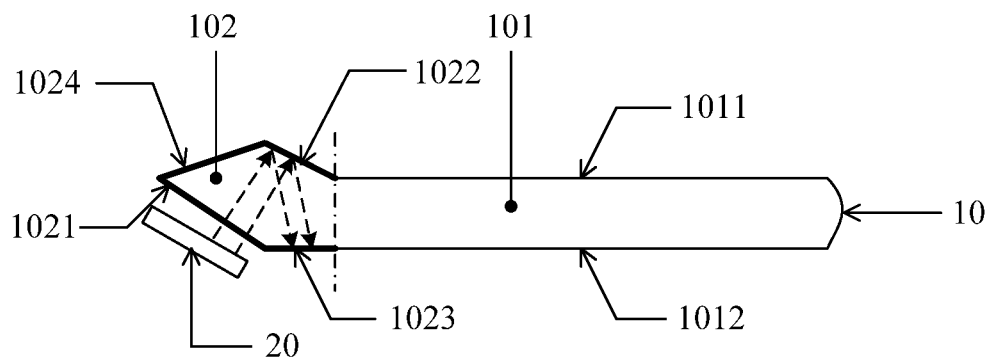
Figures 3, 4:
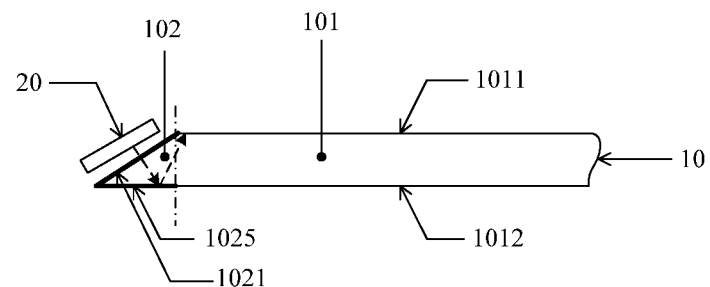
Figure 5:
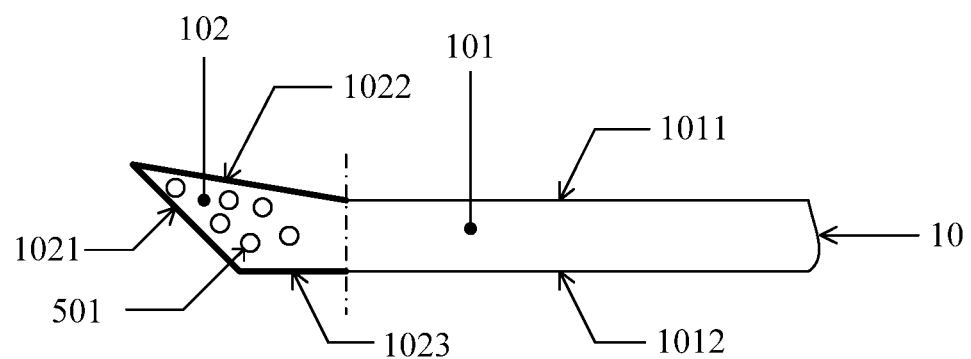

In an alternative embodiment, a light diffusion structure may be arranged in the prism structure. Illustratively, as shown in FIG. 5, the light diffusion structure may comprise diffusion particles or bubbles 501. With the light diffusion structure such as the diffusion particles or bubbles 501 arranged in the prism structure, the incident light can be scattered in the prism structure, so that the light can be more uniform. In an embodiment, the light diffusion structure may be implemented by doping the prism structure with particles which use different material with the light guide plate. The embodiments of the present disclosure do not limit the manner of arranging the light diffusion structure in the prism structure.

In the embodiment of the present disclosure, the at least one reflective surface of the prism structure 102 may be formed by a reflective layer arranged on the outer surface of the prism structure. As shown in FIG. 2-5, the first reflective surface 1022 and the second reflective surface 1023 may be implemented by attaching reflective sheets 103 onto the outer surfaces of the prism structure. Alternatively, the first reflective surface 1022 and the second reflective surface 1023 may also be implemented by coating the outer surfaces of the prism structure with reflective material layers.

In the backlight module as shown in FIG. 1, on one hand, as the side of the plastic frame 04 where the light bar 02 is located is an external clamping structure poor in structure strength, the partial structure of the plastic frame 04 arranged on the edge of the optical film 03 is separated from the edge of the optical film 03 to form a gap after the plastic frame 04 is extruded (for example, when the backlight module is tilted backwards or when the panel is poorly engaged with the back plate 05). As a result, the light emitted by the light bar 02 may escape from the gap as shown in FIG. 3-1, or may be reflected by the plastic frame onto the uppermost layer of the optical film as shown in FIG. 3-2. On the other hand, as the optical film 03 is composed of a plurality of films, such as a diffusion film and a brightness enhancement film, and there may be a gap between the edges of the film layers as shown in FIG. 3-3, the light emitted by the light bar 02 may escape from the gap between the film layers. All of the above circumstances may cause the hot spot phenomenon in the backlight module.

In the embodiment of the present disclosure, the incident light from the light incident surface is reflected by the plurality of reflective surfaces in the prism structure, and the primary uniformity of the light has been realized when the light reaches the edge of the first surface of the light guide plate body. Even if the light escapes from the edge of the first surface of the light guide plate, the occurrence possibility of the hot spot phenomenon in the backlight module may be reduced. In addition, in the embodiment shown in FIG. 2-5, as the reflective sheet is attached onto the outer surface of the reflective surface, the light cannot escape from the position where the reflective surface of the prism structure is located. Therefore, the first surface of the light guide plate cannot be in contact with the light emitted by the light bar within 180 degrees, so that the hot spot phenomenon can be effectively avoided. In accordance with the embodiment of the present disclosure, the reflective sheet may be a non-transparent reflective sheet.

In an embodiment, diffusion particles may be arranged between the reflective layer and the outer surface of the prism structure. Illustratively, under the condition that the reflective layer is a reflective sheet attached onto the outer surface of the prism structure, diffusion particles may be arranged on the reflective sheet, and then the reflective sheet with the diffusion particles may be arranged on the outer surface of the prism structure. Alternatively, the diffusion particles may be arranged on the outer surface of the prism structure, and then the reflective sheet or the reflective layer may be arranged on the outer surface of the prism structure with the diffusion particles. By arranging the diffusion particles between the reflective layer and the outer surface of the prism structure, the reflective surface can not only reflect the light but also scatter the light at the same time, so that the uniformity of the light is better.

In an embodiment, the diameters of the diffusion particles may be about 10-30 micrometers. The diffusion particles may be made from polyethylene terephthalate (PET).

In another aspect of the present disclosure, there is also provided a backlight module. As shown in FIG. 4-1, the backlight module comprises a light bar 20 and a light guide plate 10. The light guide plate may be the light guide plate 10 in any of the embodiments shown in FIGS. 2-1 to 2-5. The light emitting surface of the light bar 20 is opposite to the light incident surface 1021.

The light guide plate 10 may comprise a light guide plate body 101 and a prism structure 102 located at at least one end of the light guide plate body 101. The prism structure 102 may comprise the light incident surface 1021 and at least one reflective surface. Incident light from the light incident surface 1021 can be reflected by the at least one reflective surface into the light guide plate body 101.

In the embodiment of the present disclosure, the light guide plate body 101 and the prism structure 102 located at at least one end of the light guide plate body 101 may form an integral structure. Alternatively, the prism structure 102 may also be a separate component that is independent from the light guide plate body 101 and attached the light guide plate body 101.

The backlight module provided by the embodiment of the present disclosure comprises a light guide plate and a light bar. The light incident surface of the light guide plate is arranged in the prism structure. Light emitted by the light bar enters the prism structure from the light incident surface of the light guide plate, and then enters the light guide plate body after being reflected by the reflective surface in the prism structure. As the prism structure achieves the primary uniformity of the light by reflecting the light, the light incident in the light guide plate body can be more uniform. Therefore, the occurrence possibility of the hot spot phenomenon in the backlight module is reduced, and the optical quality of the backlight module is improved.

In an embodiment, as shown in FIG. 4-1, the at least one reflective surface on the light guide plate of the backlight module may comprise a first reflective surface 1022 and a second reflective surface 1023. The first reflective surface 1022 is adjacent to the first surface 1011, and the second reflective surface 1023 is adjacent to the second surface 1012. The light incident surface 1021 is not parallel to the second surface 1012 or the first reflective surface 1022. Incident light from the light incident surface 1021 is reflected by the first reflective surface 1022 onto the second reflective surface 1023, and then is reflected by the second reflective surface 1023 into the light guide plate body 101.

In the embodiment of the present disclosure, when manufacturing the back plate in the backlight module, a triangular platform may be formed at a corresponding position on the back plate to support and fix the light bar 20.

In an alternative embodiment, as shown in FIG. 4-2, the at least one reflective surface may further comprise a third reflective surface 1024 adjacent to the light incident surface 1021 and the first reflective surface 1022. In this embodiment, the third reflective surface can reflect a part of the light reflected by the first and second reflective surfaces into the prism structure to limit the incident light in the prism structure, so that the light utilization ratio increases.

In an alternative embodiment, as shown in FIG. 4-3, the at least one reflective surface on the light guide plate of the backlight module may comprise a fourth reflective surface 1025. The light incident surface 1021 is adjacent but not parallel to the first surface 1011, and the fourth reflective surface 1025 is coplanar with the second surface 1012. Incident light from the light incident surface 1021 is reflected by the fourth reflective surface 1025 into the light guide plate body 101. The light emitting surface of the light bar 20 is parallel to the light incident surface 1021.

The backlight module shown in FIG. 4-3 has a simple structure, which may meet the requirement of uniformization on light in the prism structure. The backlight module only needs one reflective surface, and thus it is convenient to manufacture.

Figure 6:
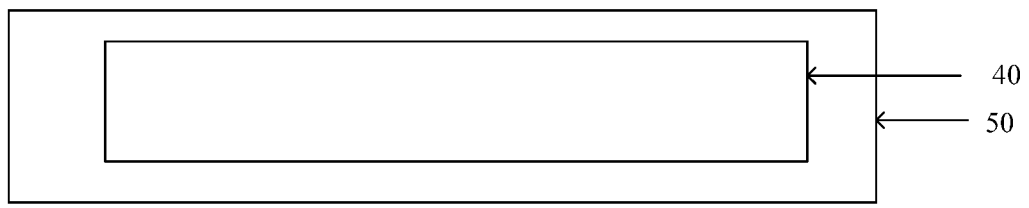
FIG. 6 is a schematic diagram of a display device provided in an embodiment of the present disclosure.

In yet another aspect of the present disclosure, there is provided a display device. FIG. 6 shows a schematic view of a display device provided by an embodiment of the present disclosure. As shown in FIG. 6, the display device 50 may comprise a backlight module 40. The backlight module 40 may be the backlight module described in any of the embodiments shown in FIG. 4-1 to 4-3.

In the embodiment of the present disclosure, the display device may be any product or component having a display function, such as a mobile phone, a tablet PC, a television, a display, a laptop, a digital photo frame, a navigator, or the like.

The display device provided by the embodiment of the present disclosure comprises a backlight module. The backlight module comprises a light guide plate and a light bar. The light incident surface of the light guide plate is arranged in the prism structure. The light emitted by the light bar enters the prism structure from the light incident surface of the light guide plate, and then enters the light guide plate body after being reflected by the reflective surface in the prism structure. As the prism structure achieves the primary uniformity of the light by reflecting the light, the light incident in the light guide plate body can be more uniform. Therefore, the occurrence possibility of the hot spot phenomenon in the backlight module can be reduced, and the optical quality of the backlight module is improved.

The foregoing description of the embodiments has been presented for purposes of illustration and description. It is not intended to be exhaustive or to limit the present disclosure. Parts or features in specific embodiments are not limited thereto. Under appropriate circumstance, they may be exchangeable and used in alternative embodiments without being specifically illustrated or descripted. Many modifications may be made to the embodiments and shall not be construed as departing from the present disclosure. All these modifications are included in the scope of the present disclosure.

What is claimed is:

1. A light guide plate, comprising:
a light guide plate body and a prism structure located at least one end of the light guide plate body, wherein
the prism structure comprises a light incident surface and at least one reflective surface, such that incident light from the light incident surface is reflected by the at least one reflective surface into the light guide plate body, wherein the at least one reflective surface is formed by a reflective layer arranged on an outer surface of the prism structure, and diffusion particles or bubbles are arranged in the prism structure and between the reflective layer and the outer surface of the prism structure, such that incident light is diffused by the diffusion particles or bubbles when being reflected by the least one reflective surface.

2. The light guide plate according to claim 1, wherein the light guide plate body comprises a first surface and a second surface opposite to the first surface, wherein the first surface is a light emitting surface of the light guide plate body;
the at least one reflective surface comprises a first reflective surface and a second reflective surface, the first reflective surface is adjacent to the first surface, and the second reflective surface is adjacent to the second surface; and
the light incident surface is not parallel to the second surface or the first reflective surface, and incident light from the light incident surface is reflected by the first reflective surface onto the second reflective surface and then is reflected by the second reflective surface into the light guide plate body.

3. The light guide plate according to claim 2, wherein the at least one reflective surface further comprises a third reflective surface adjacent to the light incident surface and the first reflective surface.

4. The light guide plate according to claim 1, wherein the light guide plate body and the prism structure form an integral structure.

5. The light guide plate according to claim 1, wherein the diameters of the diffusion particles are about 10-30 micrometers, and the material of the diffusion particles includes polyethylene terephthalate.

6. A display device, comprising: a backlight module which comprises: a light bar and a light guide plate,
wherein the light guide plate comprises:
a light guide plate body and a prism structure located at least one end of the light guide plate body, wherein
the prism structure comprises a light incident surface and at least one reflective surface, such that incident light from the light incident surface is reflected by the at least one reflective surface into the light guide plate body, wherein the at least one reflective surface is formed by a reflective layer arranged on an outer surface of the prism structure, and diffusion particles or bubbles are arranged in the prism structure and between the reflective layer and the outer surface of the prism structure, such that incident light is diffused by the diffusion particles or bubbles when being reflected by the least one reflective surface.

7. The light guide plate according to claim 1, wherein the reflective layer is one of a reflective sheet attached onto the outer surface of the prism structure and a reflective material layer coated on the outer surface of the prism structure.

8. A backlight module, comprising: a light bar and a light guide plate,
wherein the light guide plate, comprises:
a light guide plate body and a prism structure located at least one end of the light guide plate body, wherein
the prism structure comprises a light incident surface and at least one reflective surface, such that incident light from the light incident surface is reflected by the at least one reflective surface into the light guide plate body, wherein the at least one reflective surface is formed by a reflective layer arranged on an outer surface of the prism structure, and diffusion particles or bubbles are arranged in the prism structure and between the reflective layer and the outer surface of the prism structure, such that incident light is diffused by the diffusion particles or bubbles when being reflected by the least one reflective surface.

9. The backlight module according to claim 8, wherein the light guide plate body comprises a first surface and a second surface opposite to the first surface, wherein the first surface is a light emitting surface of the light guide plate body;

the at least one reflective surface comprises a first reflective surface and a second reflective surface, the first reflective surface is adjacent to the first surface, and the second reflective surface is adjacent to the second surface; and the light incident surface is not parallel to the second surface or the first reflective surface, and incident light from the light incident surface is reflected by the first reflective surface onto the second reflective surface and then is reflected by the second reflective surface into the light guide plate body.

10. The backlight module according to claim 9, wherein the at least one reflective surface further comprises a third reflective surface adjacent to the light incident surface and the first reflective surface.

11. The backlight module according to claim 8, wherein the light guide plate body and the prism structure form an integral structure.

12. The backlight module according to claim 8, wherein the diameters of the diffusion particles are about 10-30 micrometers, and the material of the diffusion particles includes polyethylene terephthalate.

13. The backlight module according to claim 8, wherein the reflective layer is one of a reflective sheet attached onto the outer surface of the prism structure and a reflective material layer coated on the outer surface of the prism structure.

14. The display device according to claim 6, wherein the diameters of the diffusion particles are about 10-30 micrometers, and the material of the diffusion particles includes polyethylene terephthalate.

15. The display device according to claim 6, wherein the light guide plate body comprises a first surface and a second surface opposite to the first surface, wherein the first surface is a light emitting surface of the light guide plate body;

the at least one reflective surface comprises a first reflective surface and a second reflective surface, the first reflective surface is adjacent to the first surface, and the second reflective surface is adjacent to the second surface; and the light incident surface is not parallel to the second surface or the first reflective surface, and incident light from the light incident surface is reflected by the first reflective surface onto the second reflective surface and then is reflected by the second reflective surface into the light guide plate body.

16. The display device according to claim 15, wherein the at least one reflective surface further comprises a third reflective surface adjacent to the light incident surface and the first reflective surface, respectively.

17. The display device according to claim 6, wherein the light guide plate body and the prism structure form an integral structure.

18. The display device according to claim 6, wherein the reflective layer is one of a reflective sheet attached onto the outer surface of the prism structure and a reflective material layer coated on the outer surface of the prism structure.

* * * * *